United States Patent [19]

Chrobaczek et al.

[11] Patent Number: 5,612,409
[45] Date of Patent: *Mar. 18, 1997

[54] ORGANOSILOXANES HAVING NITROGEN-CONTAINING AND ETHER GROUP-CONTAINING RADICALS

[75] Inventors: Harald Chrobaczek; Ingo Görlitz, both of Augsburg; Michael Messner, Diedorf-Hausen, all of Germany

[73] Assignee: Ciba-Geigy Corporation, Tarrytown, N.Y.

[ * ] Notice: The term of this patent shall not extend beyond the expiration date of Pat. No. 5,310,783.

[21] Appl. No.: 503,573

[22] Filed: Jul. 18, 1995

Related U.S. Application Data

[63] Continuation of Ser. No. 313,658, Sep. 27, 1994, abandoned, which is a continuation of Ser. No. 86,965, Jul. 2, 1993, abandoned.

[30] Foreign Application Priority Data

Jul. 9, 1992 [DE] Germany ............................ 42 22 483.7

[51] Int. Cl.$^6$ ........................... C08G 77/26; C08J 3/03
[52] U.S. Cl. ................... 524/838; 524/588; 524/804; 252/8.63; 528/14; 528/38; 528/34
[58] Field of Search ....................... 524/804, 838; 252/588, 8.8, 8.9

[56] References Cited

U.S. PATENT DOCUMENTS

| | | | |
|---|---|---|---|
| 3,565,840 | 2/1971 | Micrabile et al. | 260/23 |
| 3,653,798 | 4/1972 | Boardman | 8/15 |
| 4,018,723 | 4/1977 | Kanner et al. | 260/2.5 |
| 4,211,815 | 7/1980 | Geiner | 428/290 |
| 4,247,592 | 1/1981 | Kalinowski | 428/266 |
| 4,359,545 | 11/1982 | Ona et al. | 524/262 |
| 4,409,267 | 10/1983 | Ichinohe et al. | 427/387 |
| 4,427,815 | 1/1984 | Ona et al. | 524/315 |
| 4,450,152 | 5/1984 | Ona et al. | 424/70 |
| 4,620,878 | 11/1986 | Gee | 106/287.15 |
| 4,680,366 | 7/1987 | Tanaka et al. | 528/27 |
| 4,978,561 | 12/1990 | Cray et al. | 427/387 |
| 5,000,861 | 3/1991 | Yang | 252/8.6 |
| 5,057,572 | 10/1991 | Chrobaczek et al. | 524/588 |
| 5,078,747 | 1/1992 | Kästele et al. | 8/181 |
| 5,098,979 | 3/1992 | O'Lenick, Jr. | 528/15 |
| 5,118,535 | 6/1992 | Cray et al. | 427/387 |
| 5,130,344 | 7/1992 | Kollmeier et al. | 521/111 |
| 5,147,578 | 9/1992 | Kirk | 252/358 |
| 5,310,783 | 5/1994 | Bernheim et al. | 524/837 |

FOREIGN PATENT DOCUMENTS

| | | |
|---|---|---|
| 342830 | 11/1989 | European Pat. Off. . |
| 342834 | 11/1989 | European Pat. Off. . |
| 404027 | 12/1990 | European Pat. Off. . |
| 415254 | 3/1991 | European Pat. Off. . |
| 423687 | 4/1991 | European Pat. Off. . |
| 441530 | 8/1991 | European Pat. Off. . |
| 2302323 | 9/1976 | France . |
| 2648821 | of 1989 | France . |
| 2670221 | 6/1992 | France . |
| 2824716 | 12/1979 | Germany . |
| 3928867 | 10/1990 | Germany . |
| 4042141 | 7/1992 | Germany . |
| 52-103498 | of 1977 | Japan . |
| 52-103423 | 8/1977 | Japan . |
| 6351315 | 7/1988 | Japan . |
| 2201433 | 9/1988 | United Kingdom . |
| 9207927 | 5/1992 | WIPO . |

OTHER PUBLICATIONS

Chem. Abst. CA 93(2):9690c.
Derw. Abst. 92–261251[32]–of FR 2,670,221.
Derw. Abst. 92–218607[27] of DE 4,042,141.
Derw. Abst. 77–73309Y[41] of Jp. 52/103,498.
Derw. Abst. 90–070555[10] of Jp. 2,022,477.
Derw. Abst. 88–101,652[15] of Jp. 63 051 315.

Primary Examiner—Margaret W. Glass
Attorney, Agent, or Firm—Kevin T. Mansfield

[57] ABSTRACT

Aqueous solutions or dispersions of organooligosiloxanes or organopolysiloxanes that include one or more nitrogen-containing side chains and in which a radical containing a polyoxyalkylene unit is bonded to the second Si atom of the chain are suitable for treating fiber materials. A pleasantly soft handle is hereby imparted to the fiber materials, in particular textiles. The novel siloxanes can be obtained by reacting dialkoxysilanes containing substituents having amino groups with cyclic trisiloxanes or tetrasiloxanes, followed by reaction with silanes that contain substituents having polyoxyalkylene units.

10 Claims, No Drawings

ORGANOSILOXANES HAVING NITROGEN-CONTAINING AND ETHER GROUP-CONTAINING RADICALS

This application is a continuation of application Ser. No. 08/313,658, filed Sep. 27, 1994, now abandoned, which is a continuation of application Ser. No. 08/086,965, filed Jul. 2, 1993, abandoned.

DESCRIPTION

The present invention relates to organooligosiloxanes or organopolysiloxanes that have, in addition to one or more nitrogen-containing radicals, also a radical that contains an oligooxyalkylene chain or polyoxyalkylene chain, at least a proportion of the oxyalkylene groups being oxyethylene groups. The invention also relates to a process for preparing such siloxanes, aqueous dispersions or solutions containing the latter, and to their use for the treatment of fiber materials.

It is known to treat fiber materials, for example woven or knitted fabrics or nonwovens, with compositions that contain organooligosiloxanes or organopolysiloxanes. These compositions are normally solutions or dispersions, preferably aqueous dispersions of the corresponding siloxanes. Also, nitrogen-containing organopolysiloxanes have previously been used for the treatment of fiber materials; amino group-containing organopolysiloxanes have proved suitable, particularly if textiles treated with polysiloxanes are to have a soft handle. The siloxanes used for this purpose may be products containing amino groups and/or amido groups, as are described for example in EP-A 138 192, EP-A 342 830, EP-A 342 834 and WO 88/08436. Under certain conditions, dispersions of such N-containing polysiloxanes in the form of particularly stable aqueous microemulsions can be obtained; this is described in EP-A 138 192 and WO 88/08436.

Amino group-containing and amido group-containing polysiloxanes can be obtained by known processes, for example by reacting a silane in which two reactive groups, e.g. alkoxy groups, and a radical R containing an amino group or amido group are bonded to a Si atom, with a cyclic siloxane. Suitable cyclic siloxanes include, inter alia, hexamethylcyclotrisiloxane or octamethylcyclotetrasiloxane. The chain ends of the resultant products are often capped by trimethylsilyl groups. In known processes hexamethyldisiloxane $(CH_3)_3SiOSi(CH_3)_3$ is added to the reaction mixture for this purpose. However, this method of terminating the polysiloxane chain has the disadvantage that highly inflammable hexamethyldisiloxane has to be handled and appropriate safety measures are therefore necessary. Furthermore, with known polysiloxanes containing only amino or amido groups as functional groups, the hydrophilic/hydrophobic character is determined by the nitrogen-containing radical and can be selectively influenced only with difficulty.

Often polysiloxanes containing amino and/or amido groups are dispersed in water by means of non-ionogenic dispersants in order to produce emulsions. The dispersants used for this purpose are for example compounds containing polyoxyalkylene groups, in particular polyoxyethylene groups. In order to obtain stable dispersions, considerable amounts of dispersants are frequently necessary, especially if microemulsions are to be prepared. Besides the expense and ecological problems, this also has the disadvantage that the textiles treated with the dispersions do not exhibit optimum rub fastnesses.

It was therefore the object of the present invention to provide amino group-containing and/or amido group-containing organooligosiloxanes or organopolysiloxanes that can be prepared from starting materials that are less flammable than those used in the case of the preparation of known polysiloxanes, whose hydrophilic/hydrophobic character can be selectively influenced, and that can be converted with comparatively small amounts of dispersants into stable aqueous dispersions.

This object has been achieved by nitrogen-containing organooligosiloxanes or organopolysiloxanes of the general formula (I)

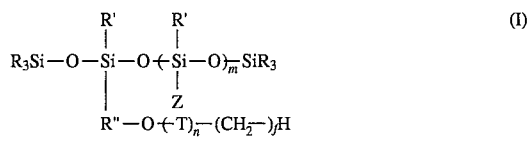

where each radical R is either a methyl or a phenyl radical, where R" is a divalent, unbranched or branched organic radical containing 1 to 6 carbon atoms, preferably a saturated alkylene radical, in particular $-(CH_2)_3-$,
n is a number from 5 to 25,
m is a number from 20 to 1500,
f has the value 0 or 1,
where from 60 to 100% of all radicals T present are $-CH_2-CH_2-O$ and from 0 to 40% of all radicals T present are

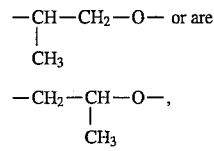

all radicals Z are, independently of one another, either R' or R'" or $R^{IV}$ or $R^V$, R'" being a radical of the general formula (IIa) or (IIb) and $R^{IV}$ being a radical of the general formula (III)

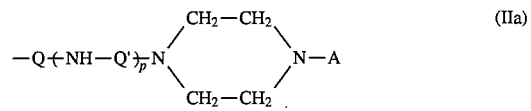

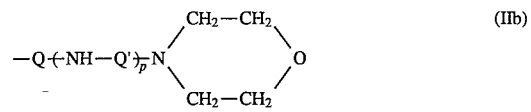

A being hydrogen or an alkyl group containing 1 to 4 carbon atoms, where Q and Q' are in each case a divalent, unbranched or branched alkylene radical containing 1 to 4 carbon atoms, where p=0 or 1 and where all radicals X present are, independently of one another, hydrogen, an alkyl radical containing 1 to 6 carbon atoms, which may be substituted by one or more hydroxyl groups, or are the cyclohexyl radical or the radical $-CO-Y$, Y being an aliphatic radical containing 1 to 6 carbon atoms which can have one or more hydroxyl groups as substituents, $R^V$ being a radical of the formula

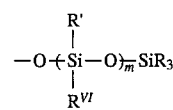

-continued or of the formula

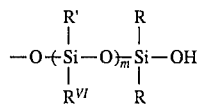

where all radicals $R^{VI}$ present are, independently of one another, R', R''', $R^{IV}$ or $R^V$, with the proviso that at least one of the radicals Z or $R^{VI}$ present is a radical R''' or a radical $R^{IV}$, all radicals R' being in each case a radical $R^V$ or a phenyl radical or alkyl radical containing 1 to 4 carbon atoms, preferably a methyl radical or ethyl radical.

The organooligosiloxanes or polysiloxanes according to the invention have the following advantages:

1. They can be prepared from starting substances that are substantially less critical as regards flammability than the hexamethyldisiloxane or similar short-chain Si compounds often used hitherto for chain termination (of nitrogen-containing polysiloxanes). These products, which are substantially more advantageous as regards flammability and can be used for the preparation of siloxanes according to the invention, are described in more detail hereinafter.

2. The amount of dispersant that is necessary to convert the siloxanes according to the invention into stable aqueous dispersions can be kept lower than in the case of polysiloxanes that contain only amino or amido groups but no groupings $-(T)_n$, i.e. no polyoxyalkylene groups. This leads to ecological advantages and to improved rub fastnesses of fiber materials, in particular textiles, treated with products according to the invention. In special cases the addition of dispersants may be completely dispensed with, namely if the siloxanes according to the invention are per se water-soluble or self-emulsifying on account of suitable substitution. In many cases, dispersions or solutions of polysiloxanes according to the invention also have a lesser tendency to foam formation than emulsions of amido-functional or amino-functional polysiloxanes that do not contain any groups $-(T)_n$ and which have been emulsified by adding fairly large amounts of non-ionic emulsifiers. This reduced foam formation in the case of dispersions of products according to the invention can provide considerable processing advantages.

3. The hydrophilic properties of products according to the invention can also be specifically adjusted in a simple way. This can be achieved by varying the number of $-CH_2-CH_2-O-$ units (varying the value of n in formula (I)), by using appropriate starting compounds in a preparation process which is described in more detail hereinafter. Accordingly, it is also possible to influence the handle of the textiles that have been treated with products according to the invention by choosing suitable values for the number n of the $-CH_2-CH_2-O-$ units (T) (a proportion of which can be replaced by polyoxypropylene units). This selective influencing of the properties can also be achieved in another way, besides choosing suitable values for the number n of these aforementioned units, namely by maintaining specific quantitative ratios of the starting substances relative to one another in the preparation of the siloxanes according to the invention. Since the products formed in the inventive process always include only one radical $-(T)_n$ that contains $-CH_2-CH_2-O-$ units, the hydrophilic character imparted by the $-CH_2-CH_2-O-$ units can be influenced by increasing the amount of nitrogen-containing silane used. Particularly in the case where an especially soft handle of suitably treated textiles is required, this can be achieved by reducing the proportion of $-CH_2-CH_2-O-$ units, based on the total product; products can be obtained that impart to the treated textiles a more pleasing handle than do commercially available products ("comb surfactants"), which contain on several Si atoms of the same molecule radicals with $-CH_2-CH_2-O-$ units and, overall, a high proportion of such units.

4. Compared to known "comb surfactants", which are products that include on several Si atoms of one and the same polysiloxane chain radicals that contain polyoxyethylene groups (these groups for example being bonded via alkylene groups to the relevant Si atoms), polysiloxanes according to the invention have the advantage that they impart a softer handle to textiles treated with them, with at the same time improved permanence of the effects with respect to washing.

5. In many cases siloxanes according to the invention can very easily be convened into particularly advantageous stable aqueous microemulsions. These finely particulate microemulsions, which can be prepared according to known methods (as described in EP-A 138 192, WO 88/08436) have particularly favorable applicational properties. Moreover, microemulsions can also be prepared with siloxanes according to the invention that additionally contain fatty acid N-alkanolamides and that lead to a particularly soft and full handle of fiber materials, for example textiles, treated 6. In the case of the preferred embodiment, in which aqueous dispersions are present that contain, in addition to siloxanes according to the invention, also one or more compounds of the formula $R^a-CH(R^b)-R^c-O-R^d$, these dispersions can be obtained having a high content (in some cases up to 80% by weight) of siloxane; despite this high proportion of active component, these dispersions can be diluted with water without causing any problems. The highly concentrated dispersions are advantageous, inter alia, on account of the reduced transportation costs.

The organooligosiloxanes or organopolysiloxanes according to the invention contain nitrogen and are represented by the formula (I) given above. The compounds are described as oligosiloxanes or polysiloxanes depending on the value of m in this formula. The value of m is in each case from 20 to 1500, preferably from 100 to 750. The ends of the main chains of siloxanes according to the invention are formed in each case by $R_3Si$ groups. In the case where the siloxanes according to the invention contain radicals $R^V$, i.e. are branched oligosiloxanes or polysiloxanes that also contain Si atoms in side chains, the ends of the side chains can likewise be formed by $R_3Si$ units; however, the side chains may also be terminated by $R_2Si-OH-$ units. The six or more radicals R that are present overall in the siloxanes according to the invention are all, independently of one another, either methyl or phenyl radicals. At least one radical R' is bonded to each silicon atom within the siloxane chain, though several Si atoms may be present in the chain, to which in each case two radicals R' are bonded; this is preferred and is normally the case, for only in exceptional cases are all radicals Z (see formula I)) different from R', i.e. only in rare exceptional cases is it that all radicals Z are R''' or $R^{IV}$ or $R^V$.

All radicals R' are, independently of one another, radicals $R^V$ of the aforementioned type, phenyl radicals, or alkyl radicals containing 1 to 4 carbon atoms, and in particular from 70% to 100% of all radicals R' are preferably methyl radicals. Particularly preferred are products in which all radicals R and all radicals R' and also all radicals Z that are not R''' or $R^{IV}$ or $R^V$ are methyl radicals. In addition to the aforementioned radicals R and R', the siloxanes according to the invention contain exactly one grouping of the formula $-R''-O-(T)_n-(CH_2)_r-H$, the divalent radical R'' of this grouping being bonded to the second (i.e. the penultimate) silicon atom of the siloxane main chain. The radical R" is a divalent, branched or unbranched organic radical containing 1 to 6 carbon atoms, and is preferably a saturated alkylene radical, in particular of the formula $-(CH_2-)_s$, where s=1 to 6, and particularly preferably R" is $-(CH_2-)_3$. The number n in the aforementioned grouping specifies the number of $-(T)-$units and is in the range from 5 to 25. Preferably, n is in the range from 10 to 20. The grouping $-(T)-$bonded to the second Si atom of the siloxane chain contains polyoxyethylene units, and may additionally contain polyoxypropylene units. The value of n is obviously an average value, since in the preparation of compounds containing polyoxyalkylene groups them is always a certain chain length distribution. A unit containing polyoxyalkylene groups $-(T)_n$ is bonded via R" to the second (or penultimate) Si atom of the polysiloxanes according to the invention. This unit must contain polyoxyethylene (EO) groups, and in fact at least 60% of all existing groups T must be polyoxyethylene groups. The remaining 40% may likewise be polyoxyethylene groups, though a proportion or all of these residual groups T may also be polyoxypropylene (130) groups. If both EO and 130 units are present in a side chain $-R''-(T)_n-(CH_2-)_f$H, these may be distributed randomly or in the form of blocks. Preferably, 100% of all units T are polyoxyethylene groups. The grouping containing $-(CH_2CH_2O)-$ units, which is bonded via $-R''O-$ to the second Si atom of the siloxane chain, has a hydroxyl or a methoxy group at the other end (f in formula (I) is 0 or 1). The oligosiloxanes or polysiloxanes according to the invention may also be present in the form of a mixture of compounds in which in one pan of the molecules f=0 and in the other pan f=1, i.e. there is partial etherification with methyl groups.

In the siloxanes according to the invention a radical R' of the aforedescribed type and a radical Z are bonded to all silicon atoms of the main chain with the exception of the two terminal atoms and one of the two Si atoms attached thereto. In the case where the siloxanes according to the invention are branched, i.e. have Si-containing side chains, the chain—terminated by two $R_3Si$ groups—that contains the Si atom to which $-R''-O-(T)_n-(CH_2-)_f$H is bonded is termed the main chain.

All radicals Z are, independently of one another, a radical R' of the aforedescribed type or a radical R''' or a radical $R^{IV}$ or a radical $R^V$. Preferably, all radicals Z are either R' or R''' or $R^{IV}$. However, at least one of the radicals Z must be a radical R''' or $R^{IV}$, except in those cases in which at least one radical $R^V$ (side chain containing Si atoms) and thus also at least one radical $R^{VI}$ (of the aforementioned type) is present that is a radical R''' or $R^{IV}$. The requirement according to which at least one of all radicals Z or $R^{VI}$ present must be a radical R''' or $R^{IV}$ means that the siloxanes according to the invention must include at least one nitrogen-containing radical covered by the formula (IIa) or (IIb) (radical R''') or the formula III (radical $R^{IV}$). However, a plurality of such radicals of the formula (IIa) or (IIb) and/or of the formula III may also be present. Those siloxanes according to the invention in which all radicals Z are R' or $R^{IV}$ (at least one of them being $R^{IV}$) have proved particularly suitable for the treatment of fiber materials.

One or more of the radicals Z may be a radical $R^V$ of the formula

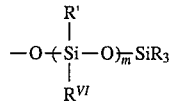

or of the formula

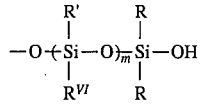

In the case (which however is not particularly preferred) where none of the radicals Z is a nitrogen-containing radical R''' or $R^{IV}$, at least one of the radicals Z present must be a radical $R^V$, and in this case at least one of the radicals $R^{VI}$ present (in radicals $R^V$) must be a radical R''' or $R^{IV}$, i.e. must be a nitrogen-containing radical of the formula (IIa) or (IIb) or of the formula III.

All radicals $R^{VI}$ present are, independently of one another, a radical R', a radical R''', a radical $R^{IV}$ or a radical $R^V$ of the described types. In any case it must be ensured that the siloxanes according to the invention contain at least one radical Z or one radical $R^{VI}$ that is a nitrogen-containing radical R''' of the formula (IIa) or (IIb) or a radical $R^{IV}$ of the formula III.

The fact that one or more of the radicals Z may be a radical $R^V$ means that a branched polysiloxane may be present. Since the Si atoms contained in the branching contain radicals $R^{VI}$, which in mm may be radicals $R^V$, it is also possible for the siloxanes according to the invention to include Si-containing side chains, which in turn are themselves branched. The meanings of R, R' and m given for the radical $R^V$ in the above formula are the same as specified in claim 1 and for formula (I). In the case where $R^V$ is a radical (of the above-specified formula) in which Si—OH units are present, these OH groups can be involved in crosslinking reactions.

The number m of the groupings —Si(R')(Z)—O— in the siloxanes according to the invention is in the range from 20 to 1500, preferably in the range from 100 to 750. The number m can be adjusted via the reaction conditions, for example by the quantitative ratios of starting compounds used, adopted in the preparation of the siloxanes. In the case where radicals $R^V$ are present, the upper limit of the extent of the branching and of the total number of Si atoms present should expediently be governed by the products, becoming difficult to handle due to their excessive viscosities. If Si-containing side chains are present the sum of the two values of m (main chain and side chain) is preferably not more than 1500, in particular not more than 750.

One or more of the radicals Z in the siloxanes according to the invention is a radical R''' or $R^{IV}$ or $R^V$. All radicals R''' present are a radical of the following formula (IIa) or (IIb), and all radicals $R^{IV}$ are a radical of formula III. Siloxanes according to the invention in which several radicals R''' or $R^{IV}$, different from one another, are present may be obtained for example by using a mixture of different dialkoxyarninosilanes in their preparation according to a process as described hereinbelow. Each radical R''' is a radical of the formula (IIa)

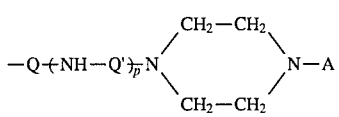

or of the formula

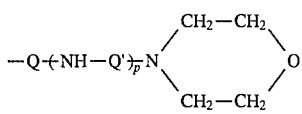

and each radical $R^{IV}$ is a radical of the formula (III)

$$-Q-(NX-Q')_{\overline{p}}NX_2 \quad (III)$$

In these formulae A is hydrogen or an alkyl group containing 1 to 4 carbon atoms, in particular a methyl group. Q and Q' are in each case a divalent, branched or unbranched alkylene radical containing 1 to 4 carbon atoms, preferably in each case a saturated alkylene radical containing 2 to 4 carbon atoms. The index p is 0 or 1, and all radicals X present are, independently of one another, either hydrogen, an alkyl radical containing 1 to 6 carbon atoms, which may contain one or more hydroxyl groups as substituents, the cyclohexyl radical, or the radical —CO—Y. The last-mentioned case (X=—CO—Y) thus corresponds to siloxanes with amido group-containing side chains. Such amido group-containing (poly)siloxanes are in many cases advantageous since they produce no or only a slight yellowing of textiles treated therewith; similar advantages are obtained with siloxanes containing piperazino groups or morpholine units (formula II (a) and (IIb)). Amido group-containing polysiloxanes according to the invention (X=—CO—Y) may for example be obtained by reacting, according to the process described below, dialkoxyaminosilanes of the formula (R'O)$_2$Si(R')—(CH$_2$—)$_3$—NH—(CH$_2$)$_2$—NH$_2$ with hexamethylcyclotrisiloxane and a polyoxyethylene group-containing silane (component c) of the process described hereinbelow) and then converting the terminal primary and/or secondary amino groups present in the side chains into amido groups. This can be effected by means of a lactone, e.g. butyrolactone, or by means of a carboxylic acid anhydride, e.g. acetic anhydride, according to known methods (EP-A 342 830 and EP-A 342 834). In the case of the reaction with butyrolactone, products are formed in which the radical Y contains a terminal hydroxyl group.

If X is —CO—Y, then Y is an aliphatic radical containing 1 to 6 carbon atoms. This radical may contain one or more hydroxyl groups as substituents, particular preference being given to products that contain a hydroxyl group as substituent on the terminal carbon atom. Polysiloxanes with amido group-containing radicals are described in EP-A 342 830 and in EP-A 342 834. The structures given there for the amido group-containing radicals bonded to Si atoms are also suitable as radicals $R^{IV}$ for the siloxanes according to the invention. The radicals containing amino groups but no amido groups, which am bonded to Si atoms and are mentioned in EP-A 138 192 and WO 88/08436, are likewise suitable as radicals $R^{IV}$ for siloxanes according to the invention.

Polysiloxanes according to the invention in which a radical $R^{IV}$ is present and in which X is —CO—Y may also be obtained by replacing butyrolactone in the aforementioned conversion of amino groups by other lactones containing several hydroxyl groups. A suitable variant for this purpose is the reaction of the aforementioned amino group-containing and polyoxyethylene group-containing oligosiloxanes and polysiloxanes with delta-gluconolactone. In this case products are formed in which X is CO—Y and Y contains several hydroxyl groups, i.e. products in which Y is —(CHOH)$_4$—CH$_2$OH.

Siloxanes according to the invention in which one or more radicals X are an alkyl radical that contains an hydroxyl group as substituent can for example be obtained by adding ethylene oxide to the corresponding primary and/or secondary amino groups, instead of the aforedescribed addition of lactone, the addition of ethylene oxide yielding monoethanolamine or diethanolamine derivatives. Instead of ethylene oxide, derivatives thereof may also be used, for example an ethylene oxide substituted by a —CH$_2$OH group. As already mentioned, in the normal case only some of the radicals Z in the siloxanes according to the invention (see formula (I)) are in each case a radical R''' or $R^{IV}$ or $R^V$, i.e. normally a proportion of the radicals Z is in each case a radical R', preferably from 70 to 100% of all radicals R' being methyl groups. It is also possible for all radicals Z with the exception of one radical to be R', R' having the meaning given above and in claim 1, and preferably from 70 to 100% of all radicals R' are methyl groups. Particularly preferred siloxanes according to the invention are notable for the fact that from 25 to 95% of all radicals Z present are methyl groups and the remaining radicals Z are radicals R''' or $R^{IV}$ of the formula (IIa) or (IIb) or (III). In particular, preference is given to products of the formula

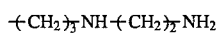

or of the formula

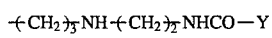

or of the formula

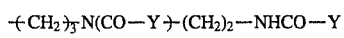

or of the formula

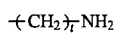

where t is 2 or 3.

Y has the meaning given above. The proportion of the radicals Z that are methyl groups can be regulated via the quantitative ratios employed in the preparation of the siloxanes.

A number of organooligosiloxanes or organopolysiloxanes according to the invention can be prepared in an advantageous manner by reacting together the following in the presence of water, preferably at a temperature of from 80° to 130° C.:

a) a nitrogen-containing silane of the formula

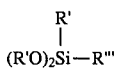

or of the formula

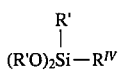

b) a cyclic siloxane of the formula

and c) a silane of the formula

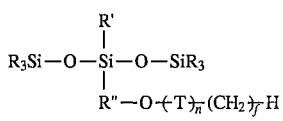

R, R', R", R''', T, $R^{IV}$ and n having the meanings given above and in claim 1, r being 3 or 4, and f having the value 0 or 1, with the restriction that in the silanes according to the formulae given for component a), the radicals R' bonded to oxygen are not $R^V$.

If desired the reaction can be carried out in such a way that all three components a), b) and c) and water are present in the reaction mixture at the start of the reaction. When performing the synthesis it may however be advantageous to react together firstly only the components a) and b) in the presence of water, preferably with the co-use of a catalyst, for example potassium hydroxide, and only then to add the component c). In this connection the first stage, i.e. the reaction of a) with b), may for example be performed at a temperature in the range from 80° to 90° C., and the second stage, i.e. the reaction with component c), may be carried out at a higher temperature, e.g. from 100° to 130° C. In the presence of water, alcohol (R'OH) is released from the R'O group-containing silane (component a)). The amount of water present should accordingly be at least sufficiently large that all R'O groups present can be eliminated as R'OH. The reaction is carried out in a preferred embodiment in the presence of a base. An alkali metal hydroxide may be used as base.

In the aforementioned synthesis it may often be expedient not to use amido group-containing radicals $R^{IV}$, but only amino group-containing radicals R''' or $R^{IV}$. If it is desired that the end products according to the invention contain amido groups, these can also be introduced subsequently by the reaction of a primary amino group with a lactone or a carboxylic acid anhydride. Suitable compounds for this purpose are butyrolactone or acetic anhydride.

The component a) is a silane in which a radical R' and R''' or $R^{IV}$ of the aforementioned type are bonded to the Si atom. Also, two radicals R'O, preferably two alkoxy radicals (in particular methoxy radicals) or phenoxy radicals are bonded to the Si atom. These reactive radicals R'O permit the reaction with component b), a cyclic siloxane, with ring opening. The component c), a silane of the aforementioned type, effects the introduction of the unit $-R'''-O-(T)_{\overline{n}}-(CH_2)_{\overline{f}}H$ into the siloxanes according to the invention, in which this unit is bonded to the second Si atom of the chain. Also due to component c) the two chain ends of the siloxanes according to the invention are in each case formed by R$_3$Si radicals. Particularly suitable as component b) are cyclic siloxanes in which r is 3 or 4, preferred examples being (R'=methyl) hexamethylcyclotrisiloxane and octamethylcyclotetrasiloxane. These cyclic oligosiloxanes are commercially available products. If desired r may however also have values higher than 4, e.g. up to 10. Products suitable as component a), i.e. products of the formulae

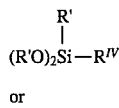

or

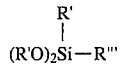

are available on the market, e.g. Dynasylan®1411 or Dynasylan®1505, from Hüls AG, Marl, Germany.

Products that can be used as component c), i.e. products of the formula

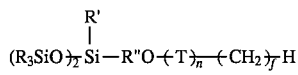

are also commercially available, an example being the product Tegopren®5878 from Th. Goldschmidt AG, Essen, Germany.

In addition, products that are suitable as component a) or as component c) can be prepared according to methods known from silicon chemistry.

The average chain length (value of m in formula (I)) of the siloxanes according to the invention, and similarly the proportion of the radicals Z that is R', relative to that proportion of the radicals Z that is R''' or $R^{IV}$, can conveniently be controlled via the relative quantitative ratios of the components a), b) and c). It is particularly preferred to carry out the process mentioned above and in claim 10 in such a way that the compounds a), b) and c) are reacted in quantitative ratios such that from 1 to 40 mol of component b) and from 0.5 to 2 mol of component c) are used per mole of component a).

The average chain length can also be controlled by the timing of the addition of the component c) (termination). Preferably, the process is carried out at a temperature in the range from 80° to 130° C.; in the case where the process is carried out in the aforedescribed manner in two stages, the temperature of the first stage may be different, for example about 20° C. lower, than the temperature of the second stage.

Besides the aforedescribed particularly preferred process, organooligosiloxanes or polysiloxanes according to the invention can also conveniently be prepared in the following way: component b) (cyclic oligosiloxane) in the aforedescribed process is replaced by an open-chain siloxane that has a reactive group at both ends. Suitable for this purpose are for example linear oligosiloxanes of the structure

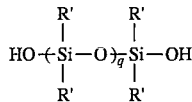

where R' is preferably CH$_3$, though all radicals R' may, independently of one another, also have the other meanings given above, with the proviso that they are not $R^V$. The value of q is preferably 2 to 5, though if desired it may also be larger.

If the process is carried out in the specified manner, namely with an open-chain siloxane instead of a cyclic siloxane as component b), the components a), b) and c) are preferably employed in the molar ratios mentioned above, though with the following change: instead of using in general from 1 to 40 mol of component b) per 1 mol of component a), the chain length and the number of Si atoms of the open-chain siloxane (component b)) should be taken into account. If this siloxane has 3 or 4 Si atoms, then from 1 to 40 mol are used by analogy with the case of the cyclic siloxane. If the open-chain siloxane contains more Si atoms, the number of moles preferably used is correspondingly lower. It is therefore preferred to use such a number of moles of open-chain siloxane per mole of component a) that this amount contains about the same number of Si atoms as 1 to 40 mol of cyclic trisiloxane or tetrasiloxane.

The two aforedescribed process variants, namely using cyclic or open-chain oligosiloxane as starting substance, can be carried out using catalysts, preferably basic catalysts, such as are known from the literature for corresponding reactions. Suitable catalysts are potassium hydroxide and potassium silanolates.

In the described process according to the invention compositions are formed that contain the organooligosiloxanes or organopolysiloxanes described above as principal products. Secondary products are also formed to a lesser extent. Normally these secondary products do not have to be separated before the products according to the invention are used for the treatment of fiber materials. This is also particularly advantageous if the reaction mixture after the reaction in aqueous medium is already present in the form of an aqueous solution or dispersion. However, if necessary the pH of this solution or dispersion still has to be adjusted, depending on the intended use, for example by neutralizing alkali metal hydroxide still present.

The aforedescribed process is suitable for preparing (preferred) examples of the siloxanes according to the invention in which one or more of the radicals Z is a radical $R'''$ or $R^{IV}$. If radicals $R^V$ are to be incorporated into the siloxanes according to the invention, i.e. the siloxane chain is to be branched, this can be achieved by using in addition trifunctional compounds $(R'O)_3Si-R'$ or $(R'O)_3Si-R'''$ or $(R'O)_3Si-R^{IV}$ in the aforedescribed preparation process.

If a novel polysiloxane or oligosiloxane formed as principal product in the described process is not water-soluble or self-dispersing, or if aqueous compositions according to the invention are to contain further water-insoluble products, it is recommended to use a dispersant or a mixture of several dispersants. These dispersants may be added to the reaction mixture before or during the reaction according to the process of the invention. They may also be added after the completion of the reaction, for example by adding to the reaction mixture obtained after the reaction an aqueous dispersion that contains a further product that is to be used for the treatment of the fiber materials.

The organooligosiloxanes or organopolysiloxanes according to the invention are ideally suitable for treating fiber materials, for example textiles in the form of woven or knitted fabrics or nonwovens. A pleasantly soft handle and also—by choosing appropriate compounds containing a larger or smaller number of $-CH_2-CH_2O-$ or polyoxypropylene units—graduated hydrophilic properties can be imparted in this way to the fiber materials. The use in particular of siloxanes in which the radical $R'''$ or $R^{IV}$ is an amido group, a morpholine ring or a piperazine ring results in a particularly low yellowing tendency. The handle of the textiles can be influenced further by using the siloxanes according to the invention in combination with fatty acid alkanolamides or with dispersed polyethylene waxes. Products suitable for this purpose are described further hereinbelow.

For the treatment of fiber materials, organooligosiloxanes or organopolysiloxanes according to the invention are used especially in the form of solutions or dispersions which may be diluted to the desired concentration before use and to which may be added further agents that are conventionally used for the treatment of fiber materials, for example flameproofing agents or cellulose crosslinking agents in order to improve the crease properties. The application of the dispersions or solutions to the fiber materials can be performed according to generally known methods, e.g. using a pad mangle.

Although in principle the siloxanes according to the invention can also be used as a solution or dispersion in an organic solvent, it is preferable for environmental and cost reasons to use them in the form of an aqueous solution or dispersion; preferably aqueous solutions or dispersions containing from 10 to 50% by weight, in some cases also up to 80% by weight, of organooligosiloxane or organopolysiloxane, based on the total dispersion or total solution, are first of all prepared. Solutions or dispersions of products according to the invention can be stored, transported and delivered to the consumer in this form. For use in the treatment of fiber materials, expediently from about 3 to 50 g of these solutions or dispersions are used per liter of water. The mount used in each individual case depends on the application technology. Before use, further products conventionally used in the treatment of fiber materials can be added to these liquors diluted to the ready-for-use concentration.

Known dispersants and emulsifiers, for example nonionogenic dispersants from the group comprising ethoxylated alcohols or ethoxylated fatty acids, can be used to disperse siloxanes according to the invention in water (if these are not self-dispersing or soluble). The dispersion is performed using known methods and apparatus. In many cases it is possible to disperse siloxanes according to the invention in water so as to produce microemulsions. These microemulsions, which may contain further additives such as fatty acid alkanolamides, are notable for the fact that the dispersed substances are present in a particularly finely divided form. The microemulsions are in many cases optically clear and have outstanding stability. Processes as are described in EP-A 138 192 or WO 88/08436 may be used for their preparation.

In preferred embodiments the aqueous solutions or dispersions also contain, besides siloxanes according to the invention, one or more of the following constituents: fatty acid alkanolamides, dispersed polyethylene waxes and compounds of the formula (VII)

These compounds of the formula VII are discussed in more detail hereinbelow.

The handle of textiles that are treated with dispersions or solutions according to the invention can be influenced, i.e. a particularly soft handle can be obtained, by adding one or more fatty acid alkanolamides. Fatty acid alkanolamides have previously been used to achieve a soft handle in fiber materials; in combination with siloxanes according to the invention fatty acid alkanolamides in the form of microemulsions can be obtained. Suitable fatty acid alkanolamides are for example monoalkanolamides or diakanolamides of the formulae

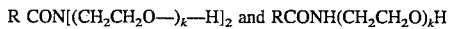

R being a saturated or unsaturated hydrocarbon radical containing 12 to 18 carbon atoms and k being a number from 1 to 10. Also suitable are alkanolamides that are derived from aromatic carboxylic acids, e.g. salicylic acid. If, as illustrated in the first-mentioned formula, two such alkanol radicals are bonded to the nitrogen atom, then k may obviously have a different value for one radical than for the other radical.

Fatty acid alkanolamides that are suitable as additives for dispersions of siloxanes according to the invention are commercially available products, as can be obtained for example by reacting the corresponding fatty acids with alkanolamines.

The handle of textiles treated with agents according to the invention can also be influenced by adding dispersed polyethylene waxes, as well as by adding fatty acid alkanolamides. It is known for example from EP-A 0 412 324, U.S. Pat. No. 4,211,815, DE-A 28 24 716, and DE-A 19 25 993 to impart a soft handle to textiles by means of dispersed polyethylene waxes. The dispersed or dispersible polyethylene waxes described in these citations are also suitable for dispersions according to the invention. These waxes are chemically modified polyethylenes. The modification normally comprises the introduction of acidic (—COOH) groups. Suitable dispersed or dispersible polyethylene waxes are commercially obtainable.

The amounts of fatty acid alkanolamide and/or of polyethylene wax and/or of one or more compounds of the formula VII described hereinbelow, which are expediently added to the dispersions or solutions according to the invention depend on the desired properties (handle of the treated textiles), but also on the stabilities of the dispersions. These amounts can easily be determined by simple experiments.

In many cases advantages as regards the properties of dispersions according to the invention can be achieved by adding one or more compounds coming under the formula (VII)

$$R^a\text{—}CH\text{—}R^c\text{—}O\text{—}R^d. \quad (VII)$$
$$\underset{R^b}{|}$$

These compounds can act as solubilizers. Depending on the nature and amount of the individual components, in many cases highly concentrated dispersions can thus be obtained that can be diluted without difficulty with water to a ready-for-use concentration without passing through a range, during the dilution, in which a separation of the dispersion into two phases occurs.

According to a preferred embodiment of a dispersion or solution according to the invention, the latter contains, in addition to a siloxane of the formula (I), a compound of the aforementioned formula (VII), where $R^a$ is H or $CH_3$, $R^b$ is —OH or —$NH_2$,

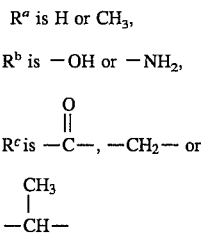

$R^d$ is an unbranched or branched alkyl radical containing 1 to 4 carbon atoms, which may have an OH group or an $OR^e$ group as substituent, $R^e$ is an unbranched or branched alkyl radical containing 1 to 4 carbon atoms, which may have an OH group as substituent.

Particularly preferred compounds of the formula (VII) are methyl lactate, ethyl lactate or an ether derived by elimination of 1 molecule of water from 2 molecules of 1,2-propylene glycol. Mixtures of such compounds (VII) may also be used. Ethers that are derived from 2 molecules of 1,2-propylene glycol by elimination of 1 molecule of water are the following compounds:

$CH_3$—$CH(OH)$—$CH_2$—O—$CH_2$—$CH(OH)$—$CH_3$ $CH_3$—$CH(OH)$—$CH_2$—O—$CH(CH_3)$—$CH_2OH$ $HO$—$CH_2$—$CH(CH_3)$—O—$CH(CH_3)$—$CH_2OH$

The invention is now illustrated by examples of implementation.

EXAMPLE 1 (according to the invention)

A mixture of 36 g of Dynasylan®1411 (Hüls AG, Germany), 2.23 kg of silicone oil Z 020 (Wacker-Chemie GmbH, Germany), 12 g of water and 5 g of 45% strength potassium hydroxide was boiled under reflux for one hour in a reaction vessel. 120 g of Tegopren®5878 (Th. Goldschmidt AG, Germany) were next added. The mixture was then heated to 110° C. and boiled under reflux for 5 hours.

In order to prepare an aqueous dispersion of the resultant polysiloxane according to the invention, 6.94 kg of water, 280 g of Genapol®X 080 (Hoechst AG, Germany), 280 g of 1,2-propylene glycol and 90 g of 60% strength acetic acid were successively added to the product obtained according to the above procedure. The mixture obtained was first of all pre-emulsified and then subjected to a high-pressure emulsification at 300 bar and at about 70° C.

Dynasylan®1411 is a product (about 100% active substance) of the formula $$H_2N(CH_2)_2NH(CH_2)_3Si(CH_3)(OCH_3)_2.$$

Tegopren®5878 is an oligosiloxane terminally capped with trimethylsilyl groups (about 100% active substance) having a side chain containing about 12 polyoxyethylene units that is bonded via an alkylene group to a Si atom. Silicone oil Z 020 (about 100% active substance) is hexamethylcyclotrisiloxane. Genapol®X 080 (about 100% active substance) is an ethoxylated isotridecyl alcohol.

EXAMPLE 2 (comparative example, not according to the invention)

Example 1 was repeated, but with the following change: the product Tegopren®5878 was added only at a later point in time, namely together with Genapol X 080. Under these conditions Tegopren 5878 no longer reacts with the product obtained from Dynasylan and silicone oil Z 020. The product of Example 1 thus differs from that of Example 2 by the fact that in Example 2 a polysiloxane is present, to which no polyoxyethylene units are bonded and which is dispersed by means of a polyoxyethylene group-containing dispersant (Tegopren). In the product of Example 1 on the other hand there is no free Tegopren present or at least no significant amounts of Tegopren.

Whereas in Example 1 a stable dispersion was obtained, the product obtained according to Example 2 separated after a relatively short time into two phases.

EXAMPLE 3

Samples of blue-dyed polyester knitted fabrics were treated with a product obtained according to Example 1 and with a commercially available amino-functional polysiloxane. The commercially available polysiloxane contained, per siloxane chain, on average several side chains having in each case a terminal primary amino group and a secondary amino group in the middle of these side chains. The commercially available product contained no polyoxyalkylene groups and contained about 3.5 times the amount of nitrogen (in % by weight of N, based on active substance) compared to the novel product according to Example 1. The dispersion of the commercial product was performed in a similar way to that described in Example 2 (i.e. with the addition of Tegopren 5878 together with Genapol). The further details regarding the emulsification corresponded to those of Example 1 (addition of water, acetic acid, propylene glycol, pre-emulsification and high-pressure microemulsification). The dispersion of the product according to the invention had, for the same amount of active substance, a considerably lower cloud point index, and was therefore substantially more transparent than the dispersion of the commercial product. The rub fastness of the polyester sample that had been treated with the dispersion according to the invention was significantly better than the rub fastness of the comparison sample that had been treated with the dispersion of the commercially available polysiloxane.

EXAMPLE 4: Preparation of a microemulsion according to the invention 1.58 kg of silicone oil Z 020, 26 g of Dynasylan®1411, 8 g of water and 4 g of 45% strength potassium hydroxide were boiled together under reflux for 1 hour. After adding 85 g of Tegopren®5878, the mixture was boiled under reflux for a further 30 minutes. 2.39 kg of water was added to the resultant mixture, the latter was cooled to 60° C., and 375 g of an ethoxylated (8 EO) isotridecyl alcohol and 15 g of an ethoxylated (20 EO) isotridecyl alcohol were added. 175 g of a fatty acid diethanolamide (mainly based on stearic acid), which still contained some free diethanolamine, 75 g of coconut oil fatty acid polyglycol ester, 150 g of dipropylene glycol and 125 g of 60% strength acetic acid were then added in succession. The mixture was heated to 70° C. and kept for 15 minutes at this temperature. After adding 5 kg of water, a stable, pale yellowish microemulsion was obtained.

We claim:

1. An aqueous composition for the treatment of fiber materials to impart a soft handle thereto, which composition contains one or more compounds of the formula (VII)

where
$R^a$ is H or $CH_3$,
$R^b$ is —OH or —$NH_2$,

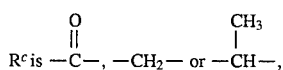

$R^d$ is an unbranched or branched alkyl radical containing 1 to 4 carbon atoms, which is unsubstituted or substituted by an OH group or an $OR^e$ group and
$R^e$ is all unbranched or branched alkyl radical containing 1 to 4 carbon atoms, which is unsubstituted or substituted by an OH group,
which composition further contains an organooligosiloxane or organopolysiloxane component, wherein said component consists essentially of an organooligosiloxane or organopolysiloxane of the formula (I)

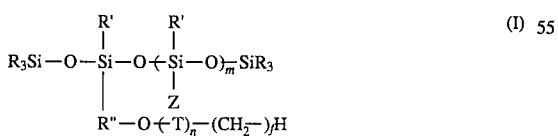

where each radical R is either a methyl or a phenyl radical, where R" is a divalent, unbranched or branched organic radical containing 1 to 6 carbon atoms,
n is a number from 5 to 25,
m is a number from 20 to 1500,
f has the value 0 or 1,
where from 60 to 100% of all radicals T present are —$CH_2$—$CH_2$—O and from 0 to 40% of all radicals T present are

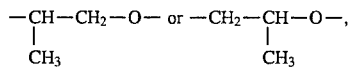

all radicals Z are, independently of one another, either R' or R''' or $R^{IV}$ or $R^V$,
R''' being a radical of the formula (IIa) or (IIb) and $R^{IV}$ being a radical of the formula (III)

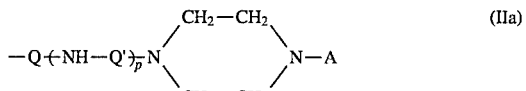

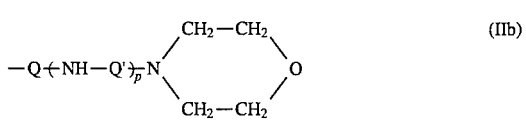

A being hydrogen or an alkyl group containing 1 to 4 carbon atoms, where Q and Q' are in each case a divalent, unbranched or branched alkylene radical containing 1 to 4 carbon atoms, where p=0 or 1 and where all radicals X present are, independently of one another, hydrogen, an alkyl radical containing 1 to 6 carbon atoms, which is unsubstituted or substituted by one or more hydroxyl groups, or are the cyclohexyl radical or the radical —CO—Y, Y being an aliphatic radical containing 1 to 6 carbon atoms which is unsubstituted or has one or more hydroxyl groups as substituents, $R^V$ being a radical of the formula

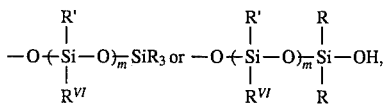

where all radicals $R^{VI}$ present are, independently of one another, R', R''', $R^{IV}$ or $R^V$, with the proviso that at least one of the radicals Z or $R^{VI}$ present is a radical R''' or a radical $R^{IV}$, all radicals R' being in each case a radical $R^V$ or a phenyl radical or alkyl radical containing 1 to 4 carbon atoms.

2. An aqueous composition as claimed in claim 1, wherein all radicals R and R' and also all radicals Z that are not R''', $R^{IV}$ or $R^V$ are methyl groups.

3. An aqueous composition as claimed in claim 1, wherein from 25 to 95% of all radicals Z present are methyl groups and the remaining radicals Z are radicals of the formula

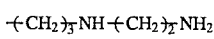

or of the formula

or of the formula

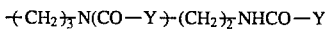

or of the formula

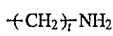

where t is 2 or 3 and Y has the meaning given in claim 1.

4. An aqueous composition containing an organooligosiloxane or organopolysiloxane of the formula (I) according to claim 1, wherein said organooligosiloxane or organopolysiloxane is obtained by reacting together the following in the presence of an amount of water which is at least sufficiently large to ensure that all R'O groups present in component a) are eliminated as R'OH:

a) a nitrogen-containing silane of the formula

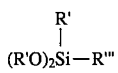

or of the formula

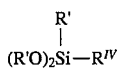

b) a cyclic siloxane of the formula

and c) a silane of the formula

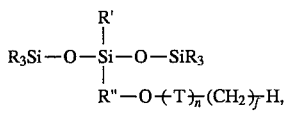

R, R', R", R''', $R^{IV}$, T, f and n having the meanings given in claim 18, and r being 3 or 4, but where the radicals R' bonded to oxygen in component a) are not $R^V$, and a dispersant optionally being added to the mixture of water and the components a), b) and c) before, during or after the reaction.

5. A composition as claimed in claim 4, wherein the reaction is carried out in the presence of a base.

6. An aqueous composition according to claim 1, wherein R" is —$(CH_2—)_3$.

7. An aqueous composition as claimed in claim 1, which further contains one or more components selected from the group consisting of dispersants, fatty acid alkanolamides, dispersed polyethylene waxes, flameproofing agents and cellulose crosslinking agents.

8. A process for treating fiber materials to impart a soft handle thereto, which comprises applying an effective amount of an aqueous composition as claimed in claim 7 to the fiber materials.

9. An aqueous composition as claimed in claim 7, in the form of a dispersion and additionally containing a dispersed polyethylene wax.

10. A process for treating fiber materials to impart a soft handle thereto, which comprises applying an effective amount of an aqueous composition as claimed in claim 1 to the fiber materials.

* * * * *